United States Patent

Göbel et al.

Patent Number: 5,636,553
Date of Patent: Jun. 10, 1997

[54] FLYWHEEL ARRANGEMENT FOR A TRANSMISSION OF A MOTOR VEHICLE

[75] Inventors: Hilmar Göbel, Grafenrheinfeld; Bernhard Schierling, Kürnach, both of Germany

[73] Assignee: Fichtel & Sachs AG, Schweinfurt, Germany

[21] Appl. No.: 426,498

[22] Filed: Apr. 20, 1995

[30] Foreign Application Priority Data

Apr. 22, 1994 [DE] Germany ............... 44 13 998.5

[51] Int. Cl.⁶ ............... F16D 3/14; F16D 13/60; F16F 15/12
[52] U.S. Cl. ............... 74/574; 74/572; 74/573 F; 192/70.17
[58] Field of Search ............... 74/572–574; 464/24, 464/65, 66, 68; 192/106.2

[56] References Cited

U.S. PATENT DOCUMENTS

| | | | |
|---|---|---|---|
| 4,856,636 | 8/1989 | Meinhard | 192/106.2 X |
| 4,936,434 | 6/1990 | Clancey | 464/24 |
| 5,042,632 | 8/1991 | Jackel | 74/574 X |
| 5,150,777 | 9/1992 | Friedmann | 464/68 |
| 5,156,249 | 10/1992 | Friedmann | 464/68 |
| 5,160,007 | 11/1992 | Reik et al. | 464/68 |
| 5,194,044 | 3/1993 | Jackel et al. | 74/574 |
| 5,293,977 | 3/1994 | Friedmann et al. | 74/574 |
| 5,493,936 | 2/1996 | Stockmann et al. | 74/573 F |
| 5,505,288 | 4/1996 | Tomiyama et al. | 464/66 |

FOREIGN PATENT DOCUMENTS

| | | |
|---|---|---|
| 3630398 | 5/1987 | Germany. |
| 2193789 | 2/1988 | United Kingdom. |

*Primary Examiner*—Vinh T. Luong
*Attorney, Agent, or Firm*—Nils H. Ljungman and Associates

[57] ABSTRACT

A flywheel arrangement has a first flywheel releasably connected with the crankshaft of an internal combustion engine, a second flywheel rotatable relative to the first flywheel, and a torque carrier including a torsional vibration damper disposed between the two flywheels in a chamber at least partially filled with a viscous medium. The chamber is bounded on its side facing the second flywheel by a cover plate, which cover plate coordinates preferably with a seal disposed in the radially inward region of the cover plate. The seal has a plurality of sealing elements disposed one after another in the discharge direction of the viscous medium, and the sealing elements are installed up to gap width on the respective associated components to be sealed, whereby at least one of these sealing elements is associated with a flow guide which is used to divert viscous medium into a return channel leading into the chamber.

20 Claims, 7 Drawing Sheets

Z

FLYWHEEL ARRANGEMENT FOR A TRANSMISSION OF A MOTOR VEHICLE

BACKGROUND OF THE INVENTION

1. Field of the Invention

The present invention generally relates to a flywheel arrangement for an internal combustion engine of a motor vehicle. Such a flywheel arrangement can have a first flywheel releasably connected with a crankshaft of the internal combustion engine, and a second flywheel limitably rotatable relative to the first flywheel mass. In addition, between the two flywheels in a chamber at least partially filled with a viscous medium, a torque carrier, including a torsional vibration damper, can be disposed. The torque carrier can be formed, for example by a hub disk or cover plate for the hub disk. The chamber can be bounded on its side facing the second flywheel by a cover plate, and the cover plate, in its radially inner region, preferably works together with a seal disposed adjacent the radially inward region of the cover plate.

2. Background Information

One such type of flywheel arrangement is disclosed by German Patent No. 36 30 398 A1. This flywheel has two flywheels twistable, or rotatable relative to each other, wherein between the flywheels, a hub disk is disposed. On this hub disk, torsional vibration dampers are provided, and thereby, the hub disc acts in conjunction with cover plates as a torque carrier. The hub disk operates in a chamber enclosed by the first flywheel and a cover plate attached thereto, which chamber is filled with a viscous medium. In the region of a radially inward end of the cover plate, the cover plate abuts a seal with one end under axial pretension, such that discharge of the viscous medium from the chamber is prevented.

Since the cover plate abuts the seal axially under pretension, friction between the cover plate and the seal will regularly occur upon relative movement between the two flywheels. The friction can result in early wear of the seal, such that the seal may no longer properly fulfill its function after a certain wear condition. If a timely replacement of the seal is missed, a discharge of the viscous medium from the chamber would essentially be inevitable, and damage may thereby result to the components of the flywheel.

OBJECT OF THE INVENTION

The object of the present invention is to therefore design the sealing region of a flywheel arrangement, that is the region where a discharge of the viscous medium from a chamber enclosing a torque carrier is possible, such as a hub disk, with a seal which is wear-free while providing essentially permanent performance of its sealing function.

SUMMARY OF THE INVENTION

The above object is achieved, in accordance with at least one embodiment of the present invention, by providing a seal which has a plurality of sealing elements disposed one after another in the discharge direction of the viscous medium. The sealing elements are preferably installed to fill the gap width between the respective associated components to be sealed, for example, a torque carrier and guide element. At least one of these sealing elements can be associated with a flow guide which can advantageously be used to divert viscous medium into a return channel leading into the chamber.

In flywheel arrangements in which the torsional vibration damper is disposed in a chamber at least partially filled with a viscous medium, a danger exists that at a very high operating temperature in the clutch, the viscous medium will release oil. This oil, like the rest of the viscous medium, would essentially be slung radially outward under the action of centrifugal forces during the rotation of the flywheel. In the radially outer region, after impact, the oil can be diverted radially inward and thus arrive in a region in which the seal according to the present invention operates.

The sealing elements of this seal can preferably be of a size which approximates the gap width between the respective associated components to be sealed. As such, the thick viscous medium can essentially be retained in the chamber with no difficulty by the seals. However, there is also the possibility that when the flywheel arrangement is next at rest, or not rotating, viscous medium, in the form of the separated thin liquid oil, will run through the gap between the respective sealing element and the associated component under the effect of gravity in the half of the clutch above the axis of rotation. This thin liquid oil would thus leave the chamber in which it is supposed to be retained. The result of this would be that the viscous medium remaining in the chamber would become increasingly viscous with increasing duration of operation of the flywheel arrangement as a result of increasingly extensive oil loss. Thus, the damping properties of the viscous medium would be altered.

To prevent this undesired effect, in accordance with at least one embodiment of the present invention, a flow guide can be associated with at least one of the sealing elements. The flow guide can essentially coordinate with a return channel leading into the chamber to control the flow of the oil. Thus, any oil which has crossed the respective preceding sealing element can be diverted by the flow guide in the direction of the return channel. This diverted flow of oil can then be reintroduced through the return channel into the chamber.

Back in the chamber, upon restarting of the flywheel arrangement, the oil would then be slung radially outward under the action of centrifugal forces. The oil can then remix during operation with the remaining viscous medium. Thus, even though a contact free, and thus wear free seal is used, leakage of the flywheel arrangement and, with it, permanent loss of the viscous medium in the chamber, can substantially be prevented. The seal is thus still unrestrictedly effective even with relatively long operation of the flywheel arrangement.

In accordance with a preferred embodiment of the present invention, the sealing elements can preferably form at least one receiving space for the viscous medium, which space can be connected to the chamber by the return channel. By means of the receiving space, under circumstances which might cause a particularly large volume flow of oil to pass the preceding sealing element, a catch basin is provided for the oil, if the oil cannot be returned quickly enough into the chamber via the return channel.

According to an alternative embodiment of the present invention, the return channel can preferably be designed such that the return channel passes through the torque carrier, which torque carrier can be formed, for example, by the hub disk or by a cover plate for the hub disk. In addition, the torque carrier can also preferably have, on the radially inner end of the return channel, a projection directed towards the seal. This projection can serve as a flow guide to divert the medium into the return channel. With this first embodiment of a flow guide, the oil, after passing through the preceding sealing element, strikes the projection of the torque carrier and, particularly if this projection has an incline in the direction of the return channel, the oil can then essentially immediately flow through the return channel into the chamber. One advantageous structural embodiment for this flow guide can be provided by fabricating the projection as an axial offset of the torque carrier in the direction of the seal.

In an alternative embodiment, adjacent the side of the return channel facing the receiving space, at the radially inner end of the return channel, there can preferably be a guide element. This guide element can then provide an alternative embodiment of a flow guide for directing the oil towards the return channel. With this type of flow guide, that oil impacting even farther from the return channel cannot collect at the receiving space, but is guided back to the return channel by the shortest possible path. This embodiment of a flow guide can also advantageously supplement the flow guide as discussed above.

This enhanced flow guide can preferably be provided by a guide element which has, in a region disposed away from the return channel, a larger external diameter as compared to the diameter at the end adjacent the radially inner end of the return channel, and then narrows radially in the direction of the return channel.

As already explained, the oil has the tendency, when the flywheel arrangement is at rest, to flow through the sealing elements, in particular above its axis of rotation. For this reason, an arrangement of the sealing elements can have sealing elements which are disposed radially with respect to one another. Such an arrangement is preferred, since a plurality of sealing elements, connected one after another, are present for the retention or the return of the oil into the chamber. A design embodiment for the sealing element disposed radially farther outward preferably has a radial widening in the direction of the component to be sealed, that is the torque carrier. As such, the following advantage can be obtained: In the flywheel arrangement set in rotation, oil which is located in the receiving space after passage through this sealing element can again be thrown radially outward under the effect of centrifugal forces, and with the configuration as described above, this oil would again arrive in the effective region of the radially farther outward sealing element. This acts like a funnel with an annular inlet because of its increasing radial expansion in the direction toward the component to be sealed, into which inlet the oil can easily enter and, again under the action of centrifugal forces, is forced radially outward until after passing through the gapped sealing region, and again enters the chamber.

In accordance with another embodiment of the present invention, the sealing element can preferably act in conjunction with an additional sealing element designed as an energy absorber. This energy absorber can preferably contact the first sealing element on the side of the first sealing element facing away from sealing point of the first sealing element. This second sealing element can preferably extend towards the guide element up to a remaining gap width between the guide element and the first sealing element, through which gap oil, impacting far from the entrance to the return channel, can be guided into the return channel along the shortest possible path.

Since the contact of the energy absorber forming the second sealing element with the respective associated element, for example, the other sealing element or the second flywheel, occurs through a preferably annular projection, the contact surface can be reduced to a contact line, which offers a particularly good seal. With the omission of such a projection, it is possible to form a barrier for the oil against outflow through the gap remaining between the energy absorber and the guide element by forming an annular protrusion on the guide element radially inside the contact area between the guide element and the energy absorber.

By torsion-free mounting of the energy absorber on one of the two sealing elements, it can be possible, if one of the sealing elements is attached to the first flywheel and the other to the second flywheel, to enable the energy absorber to be moved without torsion with one of these flywheels, for example, with the first flywheel. Then, as soon as there is a relative movement between the two flywheels, friction can be exerted on the flywheel moved, relative to the energy absorber. Thus, the seal can also act as a friction arrangement to apply a slight basic friction.

Further details regarding the embodiments of the present invention will be provided herebelow with reference to the accompanying drawings. It should be understood that when the word "invention" is used in this application, the word "invention" includes "inventions", that is, the plural of "invention". By stating "invention", Applicants do not in any way admit that the present application does not include more than one patentably and non-obviously distinct invention, and maintain the possibility that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

One aspect of the invention resides broadly in a transmission device for transmitting mechanical rotary power from an internal combustion engine of a motor vehicle to a drive shaft of a transmission of the motor vehicle, the transmission device comprising: a clutch, the clutch comprising: a hub, the hub defining an axis of rotation, the hub comprising apparatus for connecting the hub to a drive shaft of a transmission; a hub disc non-rotationally connected to the hub; at least a first plate rotatable about the axis of rotation relative to the hub; first apparatus for transmitting rotational torque between the hub disc and the at least a first plate for rotating the hub disc with the at least a first plate, the first apparatus for transmitting rotational torque comprising torsional damping apparatus for dampening relative rotational movement between the hub disc and the at least a first plate; friction linings disposed on the at least a first plate; a flywheel, the flywheel comprising: a first flywheel portion and a second flywheel portion, the second flywheel portion being disposed adjacent the first flywheel portion; the first flywheel portion comprising apparatus for non-rotationally connecting the first flywheel portion to a crankshaft of an internal combustion engine; the first flywheel portion being rotatable about an axis of rotation; the second flywheel portion being rotatable about the axis of rotation and limitably rotatable relative to the first flywheel portion; and second apparatus for transmitting rotational torque from the first flywheel portion to the second flywheel portion for rotating the second flywheel portion with the first flywheel portion, the second apparatus for transmitting rotational torque comprising second torsional damping apparatus for damping relative rotational movement between the first and second flywheel portions; the first flywheel portion comprising a first disc-shaped member and a second disc-shaped member, the second disc-shaped member being spaced axially from the first disc-shaped member to define an annular chamber between the first and second disc-shaped members, the chamber being disposed about the axis of rotation and comprising a lubricating medium therein; at least a portion of the lubricating medium being fluidizable upon heating of the lubricating medium during use of the flywheel; the second flywheel portion comprises a first disc-shaped member disposed at least partially within the chamber of the first flywheel portion and a second disc-shaped member disposed adjacent the second disc-shaped member of the first flywheel portion; the second disc-shaped member of the first flywheel portion and the second disc-shaped member of the second flywheel portion together defining a space therebetween, the space leading out of the chamber to an exterior of the flywheel; the flywheel further comprises seal apparatus disposed at least adjacent the space for sealing lubricating medium in the chamber; and the seal apparatus comprising at least first and second sealing members for sealing lubricating medium into the chamber; the space defines a direction of flow out of the chamber to the exterior of the flywheel; the seal apparatus comprises at least two annular sealing elements disposed adjacent one another about the axis of rotation, and one after the other in the direction of flow out of the chamber; and at least one of the at least two sealing elements is disposed to divert lubricating medium away from the space and back into the chamber.

Another aspect of the invention resides broadly in a flywheel for an internal combustion engine of a motor vehicle for transmitting mechanical rotary power from an internal combustion engine to a transmission, the flywheel comprising: a first flywheel portion and a second flywheel portion, the second flywheel portion being disposed adjacent the first flywheel portion; the first flywheel portion comprising apparatus for non-rotationally connecting the first flywheel portion to a crankshaft of an internal combustion engine; the first flywheel portion being rotatable about an axis of rotation; the second flywheel portion being rotatable about the axis of rotation and limitably rotatable relative to the first flywheel portion; apparatus for transmitting rotational torque from the first flywheel portion to the second flywheel portion for rotating the second flywheel portion with the first flywheel portion; the first flywheel portion comprising a first disc-shaped member and a second disc-shaped member, the second disc-shaped member being spaced axially from the first disc-shaped member to define an annular chamber between the first and second disc-shaped members, the chamber being disposed about the axis of rotation and comprising a lubricating medium therein; at least a portion of the lubricating medium being fluidizable upon heating of the lubricating medium during use of the flywheel; the second flywheel portion comprises a first disc-shaped member disposed at least partially within the chamber of the first flywheel portion and a second disc-shaped member disposed adjacent the second disc-shaped member of the first flywheel portion; the second disc-shaped member of the first flywheel portion and the second disc-shaped member of the second flywheel portion together defining a space therebetween, the space leading out of the chamber to an exterior of the flywheel; the flywheel further comprises apparatus for directing fluidized lubricating medium away from the space for minimizing loss of fluidized lubricating medium out of the chamber though the space.

BRIEF DESCRIPTION OF THE DRAWINGS

The present invention is explained in greater detail below with reference to exemplary embodiments depicted in the drawings, in which.

DESCRIPTION OF THE PREFERRED EMBODIMENTS

Figure 1:
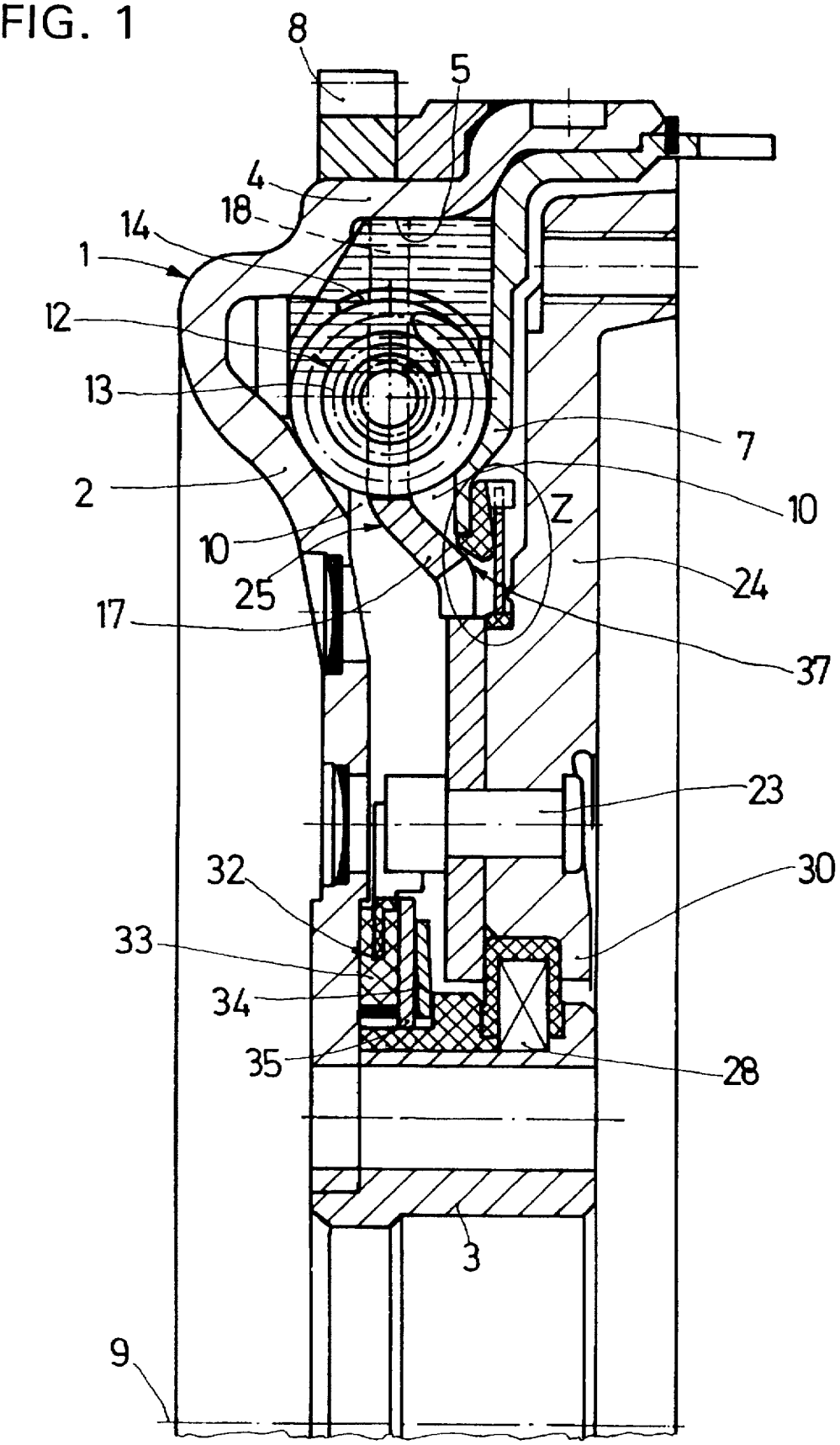
FIG. 1 depicts, in longitudinal section, the half of a flywheel arrangement lying above the axis of rotation, and including a radially further outward and a radially further inward acting sealing element.
Figure 1A:
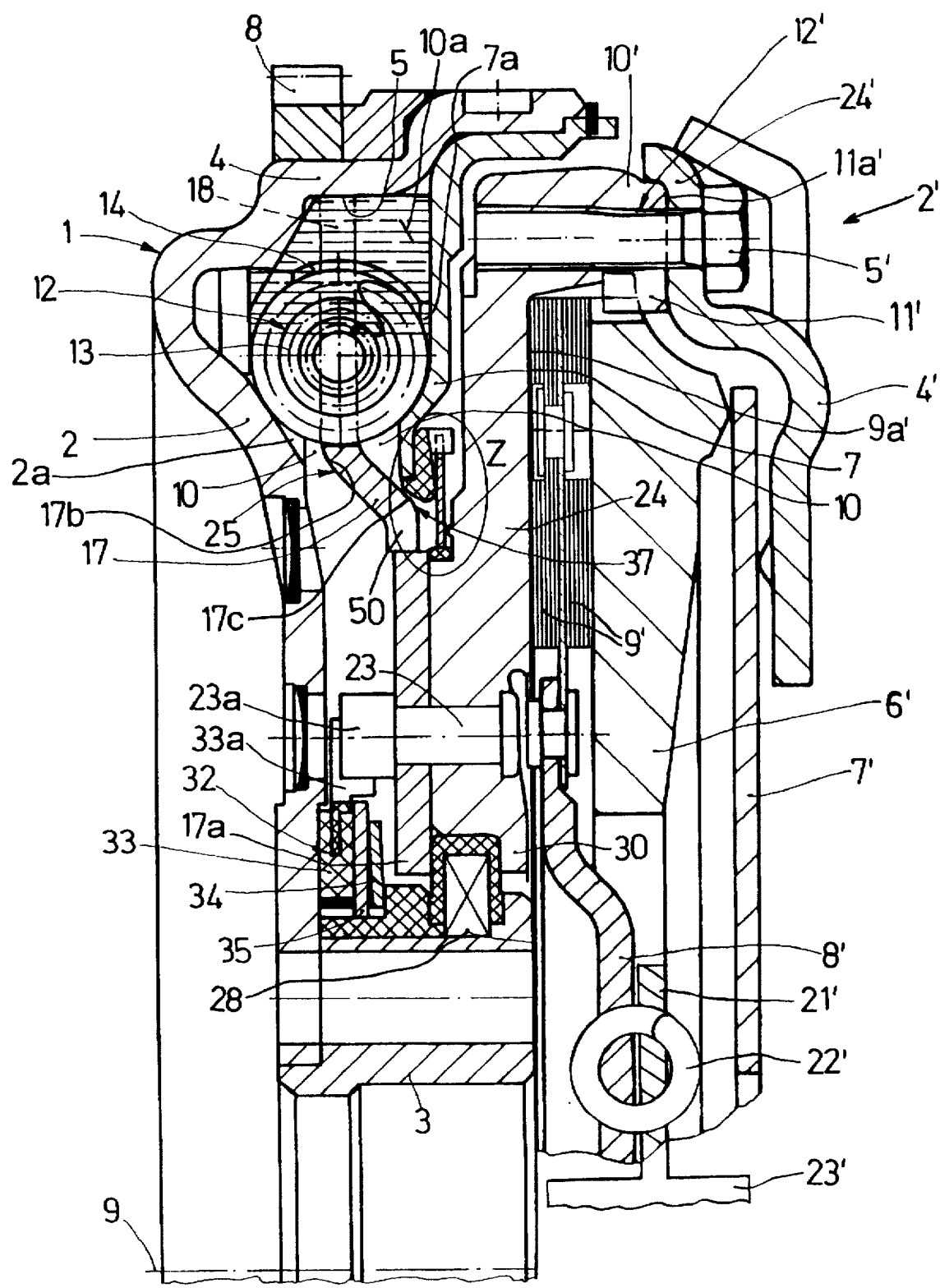
FIG. 1a depicts the same view as FIG. 1 but additionally includes a friction clutch.

FIGS. 1 and 1a show a longitudinal section through the top half of a flywheel arrangement. A flywheel arrangement can generally include a first flywheel 1 and a second flywheel or disc shaped member 24. The first flywheel 1 can be composed of a primary disc 2 solidly connected to a hub 3. The hub 3 can be releasably attached to a crankshaft (not shown here, but schematically shown in FIG. 6) of an internal combustion engine (also shown schematically in FIG. 6). The primary disc 2 can be provided, in the region of its external diameter, with an annular portion, or ring 4 (see also FIG. 5), which ring 4 can have an essentially cylindrical inner wall 5. Essentially parallel to the primary disc 2, and disposed at a distance therefrom, there can be a cover plate 7. This cover plate 7 can be solidly connected in the region of its external diameter with the ring 4 in a manner which is well known in the art, such as by welding. A flywheel ring gear 8 can be formed as one piece with the ring 4 (see FIG. 5), or, as shown in FIG. 1, can be an additional ring also rigidly connected to the ring 4. All parts connected with the hub 3 can preferably rotate along with the crankshaft of the internal combustion engine around an axis of rotation 9.

The inner wall 5 of the ring 4, as well as the radially farther out region of the primary disc 2, and the cover plate 7 can essentially form a chamber 10 therebetween, which chamber 10 can concentrically surround the axis of rotation 9. In this chamber 10, a spring stage 12 of a torsional vibration damper can be disposed. The spring stage 12 can include a plurality of springs 13 distributed about the circumference of the flywheel arrangement. Control of the springs 13 can preferably take place from the first flywheel 1 via segments attached on the insides of the primary disc 2 and the cover plate 7. Such segments could, in at least one embodiment of the present invention as shown in FIG. 1a, essentially include the projections 2a and 7a, which extend towards one another and engage an end of the springs 13. These segments can act respectively, through the intermediary of a spring guide, or casing 14, on the springs 13 in contact with the casing 14. The springs 13 may be implemented in one piece and curved, but they may also include a plurality of short springs connected one after another.

The chamber 10 can preferably be at least partially filled with a viscous medium 10a (see FIG. 1a). This viscous medium can preferably serve as a lubricant as well as for reduction of the friction between the components which can move relative to each other. The torques taken from the springs 13 can be transferred to a hub disc 17, which in this embodiment of the flywheel arrangement acts as a torque carrier 25 for the second flywheel 24. This hub disc 17 can include radially projecting noses 18 for contacting with the springs 13. The torque carrier 25 can be solidly connected with the second flywheel 24, for example, by means of rivets 23, while other fastening methods or devices which are generally well known could also be used. The second flywheel 24 can preferably be radially mounted, inside the region of rivets 23, on a bearing 28. This bearing 28 can preferably be an antifriction, or roller bearing, disposed on the hub 3, and fixed in the axial direction.

The second flywheel 24 can preferably be axially secured on the one hand by a flange 30 and on the other by a radially farther inward region 17a (FIG. 1a) of the hub disc 17. On the side of the hub disc 17 facing away from the bearing 28, a friction device 32 can preferably be disposed. This friction device 32 can generally include a friction disc 33 as well as a spring 34 and a disc 35. This friction device 32 can be designed as a load friction device and can typically be configured to operate only after traveling a certain angle, starting from the resting position.

In at least one possible configuration of the friction device 32 as shown in FIG. 1a, an extending flange portion 33a can be provided on the disc 33, and a bearing member 23a can be disposed on the rivets 23. As such, after a given amount of angular rotation, the bearing member 23a can contact the flange 33a and thereby activate the friction device 32.

The second flywheel 24 can be configured to accommodate a complete friction clutch (shown partially in FIG. 1a). This friction clutch can preferably be designed as a starting and shifting clutch. On the flywheel 24, preferably in the radially outer portion of the flywheel 24, there can preferably be an axially extending concentric wall 10'. The concentric wall 10' can surround a friction lining 9' of a clutch disc 8', preferably with a slight radial clearance. There could also be a number of lugs 11' preferably disposed at an axial distance from a friction surface 9a' between the friction lining 9' and the flywheel 24. The lugs 11' can preferably be distributed over the circumference of the concentric wall 10' and point radially inward. Threads 12' of threaded fasteners 5' can preferably be located in the vicinity of the lugs 11'.

A pressure plate 2' of a friction clutch can preferably be releasably fastened to the flywheel 24 by means of the threaded fasteners 5'. A clutch housing 4' can thereby be equipped with a flange 24', which flange 24' can extend radially outward, and which flange 24' can be in contact with a corresponding radial surface 11a' of the flywheel 24. The radial surface 11a' of the flywheel 24 can preferably be formed by the concentric wall 10' and by the lugs 11'. The pressure plate 2' preferably also has a thrust plate 6'. The thrust plate 6' can preferably be connected so that it is essentially torsionally stationary but can move axially, preferably with the clutch housing 4'. The thrust plate 6' can then be pressurized by a membrane spring 7', which membrane spring 7' can preferably be braced both on the thrust plate 6' and also on the clutch housing 4'. The thrust plate 6', by means of the membrane spring 7' can then preferably engage the friction linings 9' of the clutch disc 8' with the rotating flywheel 24, thereby also causing the clutch disc 8' to rotate. The clutch disc 8' can then, in turn cause a hub disc 21' to rotate by means of a torsion damper 22'. The hub disc 21' can be connected non-rotationally to a hub 23', which hub 23' can be connected to a shaft of a transmission, thereby causing the shaft of the transmission to rotate with the engine. Additional details regarding such a friction clutch are not included herein, as such friction clutches are generally well known.

As shown generally in FIGS. 1 and 1a, a seal 37 can preferably be disposed in the region of the radially inward end of the cover plate 7 for sealing between the cover plate 7 and the second flywheel 24. This seal 37, as can be seen more readily in FIG. 2, can include two sealing elements 38 and 39. The first sealing element 38 can be formed as a ring attached on the radially inward end of the cover plate 7. This ring-shaped sealing element 38 can be provided with a radial widening 40 extending under the radially inner edge 7b of the cover plate 7, which inner edge 7b is oriented toward the hub disc 17 acting as a torque carrier 25. The sealing element 38 preferably is formed from a soft elastic material. The widening 40 can be shaped, on its radially inner side 40a, such that with a decreasing distance to the torque carrier 25, (towards the left in FIG. 2), the surface 40a is increasingly widened radially and reaches its maximum diameter at the point 40b at which the sealing relative to the torque carrier 25 is supposed to occur.

Radially outward on the sealing element 38 at least one projection 42 can be formed. It might be desirable, in at least one embodiment of the present invention to provide possibly four such projections 42 disposed at about 90 degree intervals from one another about the ring-shaped sealing element 38. Each projection 42 can preferably be gripped on both sides by fingers 43 of an energy absorber 44, and thus, the projections 42 can essentially act as an anti-torsion element 45 for the energy absorber 44 which may be designed as a cup spring. The energy absorber 44 can preferably extend, with its radially inward end 44a towards a guide element 47 to minimize a gap between the element 47 and the energy absorber 44.

The guide element 47 can essentially be designed as a cylinder, or cylindrical sleeve, in the region adjacent the energy absorber 44 with a first external diameter, and can be provided with a reduction in external diameter on its end 47a facing the torque carrier 25 thus having a second external diameter in this region in the direction of the torque carrier 25. Thus, the end 47a of the guide element 47 can essentially be designed conically and can function as part of a flow guide 48. The guide element 47 essentially terminates at its end 47b on the second flywheel 24 and at the end 47a on the torque carrier 25. More specifically, the end 47a can be designed to terminate in a radial region of the torque carrier 25. Near this radially inward region of the torque carrier 25, there can preferably be return channels 50 extending through the hub disc 17. In general, it might be preferable that there be about 8 such return channels disposed at substantially equal intervals about the circumference, while a greater or somewhat lesser number might also be possible. At the radially inward region the inside ends 50a of the return channels 50, passing through the torque carrier 25, run out. The opposite ends 50b of the respective return channels 50, in turn, end in the chamber 10 of the flywheel arrangement.

At a point 17b of the hub disc 17 (see FIG. 1a), radially inwardly of the spring stage 12, the hub disc 17 can be deflected axially, extending from the vicinity of the spring stage 12 in an axial direction towards the seal 37 to a point 17c where the hub disc 17 can undergo yet another radially inward deflection. This point 17c can preferably be radially inside the sealing point 40b shared with the sealing element 38. In this latter part of the hub disc 17, radially inwardly of the seal 37, the aforementioned return channels 50 can be formed. On the radially inward ends of the channels 50, the hub disc 17 can be provided with an axial offset 72 in the direction toward the second flywheel 24. This axial offset 72 essentially creates an extension 52 between the conical region of the guide element 48 and the respective return channel 50. This extension 52 acts as an additional part of the flow guide 48. The function of the extension 52 and flow guide 48 are explained in greater detail herebelow.

The sealing element 38 extends closer and closer, in the axial direction and radially inwardly, to the energy absorber 44 with its side facing the energy absorber 44. As such, the sealing element 38 can contact the energy absorber 44 at a point 38a, located just outside the radially inner end of the sealing element 38, and annularly on the associated side of the energy absorber 44. This contact at point 38a creates a first sealing point. The opposite side of the energy absorber 44, towards end 44a thereof, can preferably come in contact on a projection 53 of the second flywheel 24, whereby here again a sealing point annularly encircling the axis of rotation 9 of the flywheel arrangement can thereby be created. In coordination with the guide element 47, the energy absorber 44 accordingly assumes the function of the second sealing element 39.

The mode of operation of the seal 37, as set forth above, can then be as follows:

Under severe operating conditions of the flywheel arrangement, the viscous medium filling the chamber 10 can become hot, and oil can separate out. This oil would then typically be slung radially outward under the action of the centrifugal force in the rotational operation of the flywheel arrangement. The oil would then typically strike, for example, the inner wall 5 of the ring 4, and would then be deflected radially inward at this location. The oil would then arrive in the region of the chamber 10, in which the radially inward ends of the springs 13 are located. During operation, this cycle would then preferably be repeated as the oil moves within the chamber 10.

Figure 3:
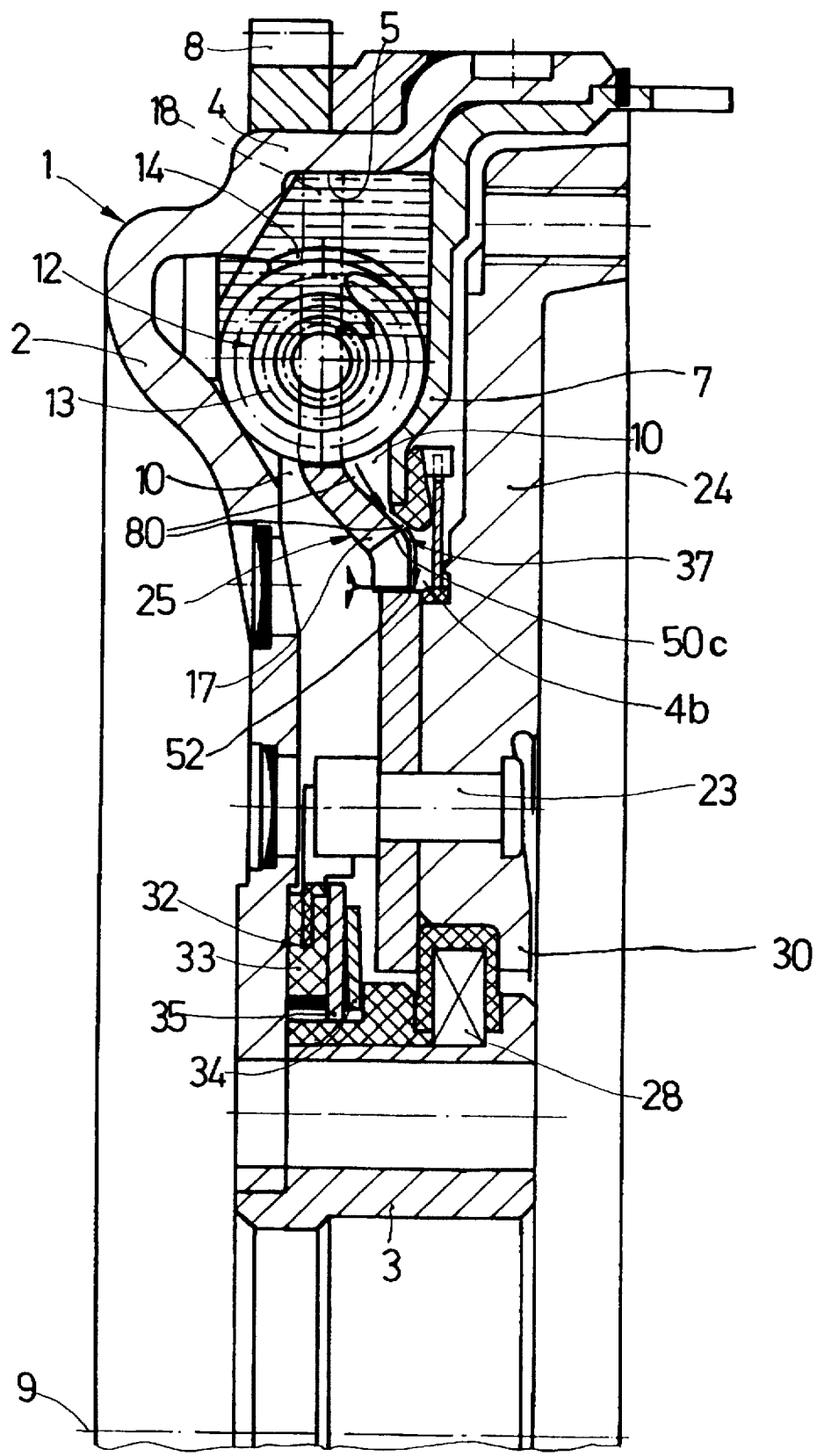
FIG. 3 is similar to the view of FIG. 1, but depicts the flow relationships in the sealing region.

Now, when the internal combustion engine driving the flywheel arrangement is turned off, whereby the flywheel arrangement comes to rest, the oil, as sketched in FIG. 3, would run along the oblique region of the hub disc 17 and arrive in the operating region of the sealing element 38. As discussed above, this sealing element 38 approaches the hub disc 17 with its widening 40, up to a gap width, and thus, a defined leakage of oil out of chamber 10 into a receiving space or ring shaped collections pad 46 can occur. As soon as the oil reaches the radially outward end 50c of the return channel 50, the oil would essentially lose its contact surface and drip downwardly, that is, for the top of the half of the flywheel arrangement disposed above the axis of rotation 9, under the effect of gravity. The dripping oil would then strike the extension 52 formed on the hub disc 17. From here, the oil can then preferably flow through the associated return channels 50 to the other side of the hub disc 17 and could thus arrive back in the chamber 10. This flowing through the return channels 50 can preferably be accented by providing a slight radially inward incline thereof in the direction of the primary disc 2.

For the case that oil striking the projection 52 of the hub disc 17 cannot be returned quickly enough through the return channels 50 into the chamber 10, it is possible that the oil could then collect in the receiving space 46. Problem-free flow back into the return channels 50 can then be handled by the guide element 47, which favors a runoff of the oil over its conic external surface, acting as flow guide 48, in the direction of the projection 52 of the hub disc 17, and thus into the associated return channel 50.

If oil has collected in the receiving space 46, a small portion of the oil could leave the receiving space 46 through the gap remaining between the radially inward end of the energy absorber 44 and the guide element 47. The vast majority of this leakage would however be retained by the projection 53 on the second flywheel 24. Oil backed up in the receiving space 46 could, moreover, be slung radially outward upon restarting of the flywheel arrangement after a temporary stop and could thus leave the receiving space 46. To prohibit this possible mode of leakage, the sealing element 38 is brought into contact at 38a with a radially inward region of the energy absorber 44, as discussed above, on the associated side thereof, such that there again a sealing surface is created, which sealing surface largely prevents undesirable leakage. Thus, instead of oil leaking outwardly from the space 46 along the energy absorber 44, the oil slung radially outward from the space 46 may leave the receiving space 46 along the surface 40a (FIG. 2), wherein the sealing element 38 would essentially act, on account of its widening 40 with a radial diameter enlargement in the direction toward the hub disc 17, as an annular funnel. Thus, upon passage of the oil along the surface 40a, the oil can penetrate back into the chamber 10 again under the effect of the centrifugal force on the sealing point.

Through the design of the seal according to the present invention, it is ensured for one thing that oil separated from the viscous medium in the chamber 10 can essentially always be returned into the chamber 10, where the oil could then recombine with the viscous medium when the temperature is again reduced.

As such, even after relatively long periods of operation of the flywheel arrangement, a drying out of the viscous medium can be prevented. In addition, because the seal 37 operates without contact to the soft sealing elements, and thus without friction so that at the sealing points, which sealing points are preferably formed with soft elastic materials, no wear essentially can occur. The seal 37 can consequently remain functional even after relatively long operation of the flywheel arrangement.

Since the energy absorber 44 is mounted in a torsion free manner on the cover plate 7, which cover plate 7 is in turn non-rotationally connected to the first flywheel 1, when the first flywheel 1 moves relative to the second flywheel 24, friction will essentially occur only between the protrusion 53 of the second flywheel 24 and the energy absorber 44. This friction between the energy absorber 44 and the second flywheel 24, which are both preferably made of metal, can essentially however be desirable and can serve to generate a slight basic friction within the flywheel arrangement.

Figure 4:
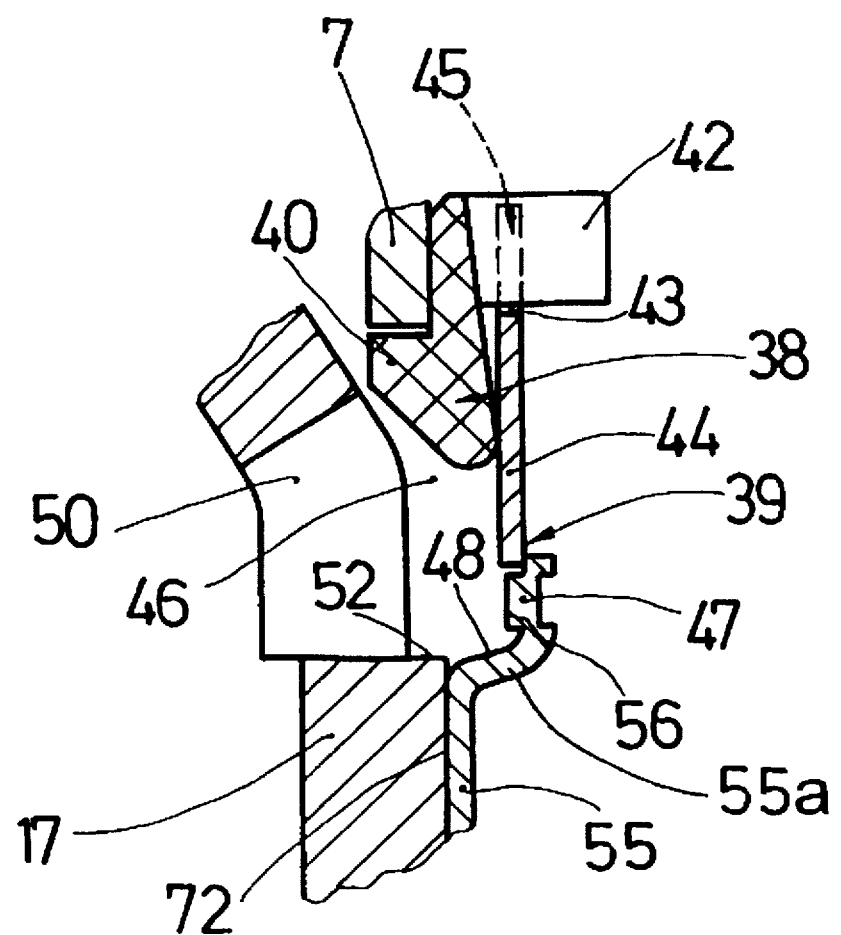
FIG. 4 is similar to FIG. 2, but shows a different structural design of the sealing elements.

FIG. 4 depicts an additional embodiment of the seal 37. This embodiment of the seal 37 essentially differs from the embodiment according to FIG. 2 primarily in the design of the guide element 47. As shown in FIG. 4, the guide element 47 can be formed by a ring 55 having a curved portion 55a curved back axially in the direction toward the second flywheel 24, essentially in about the central region of the second flywheel 24. This guide element 47 can preferably run radially outside this curve 55a, and can extend essentially parallel to the energy absorber 44. In this embodiment, the guide element 47 can be provided with a protrusion 56 disposed in the direction toward the hub disk 17, which protrusion 56 can preferably extend radially by the distance of the gap-width within its sealing point with the energy absorber 44. Thus, a barrier against any discharge of oil at the sealing point between the energy absorber 44 and the guide element 47 can essentially be formed. In accordance with this embodiment, the guide element 47 can preferably have a curved surface which can act as flow guide 48.

Figure 2:
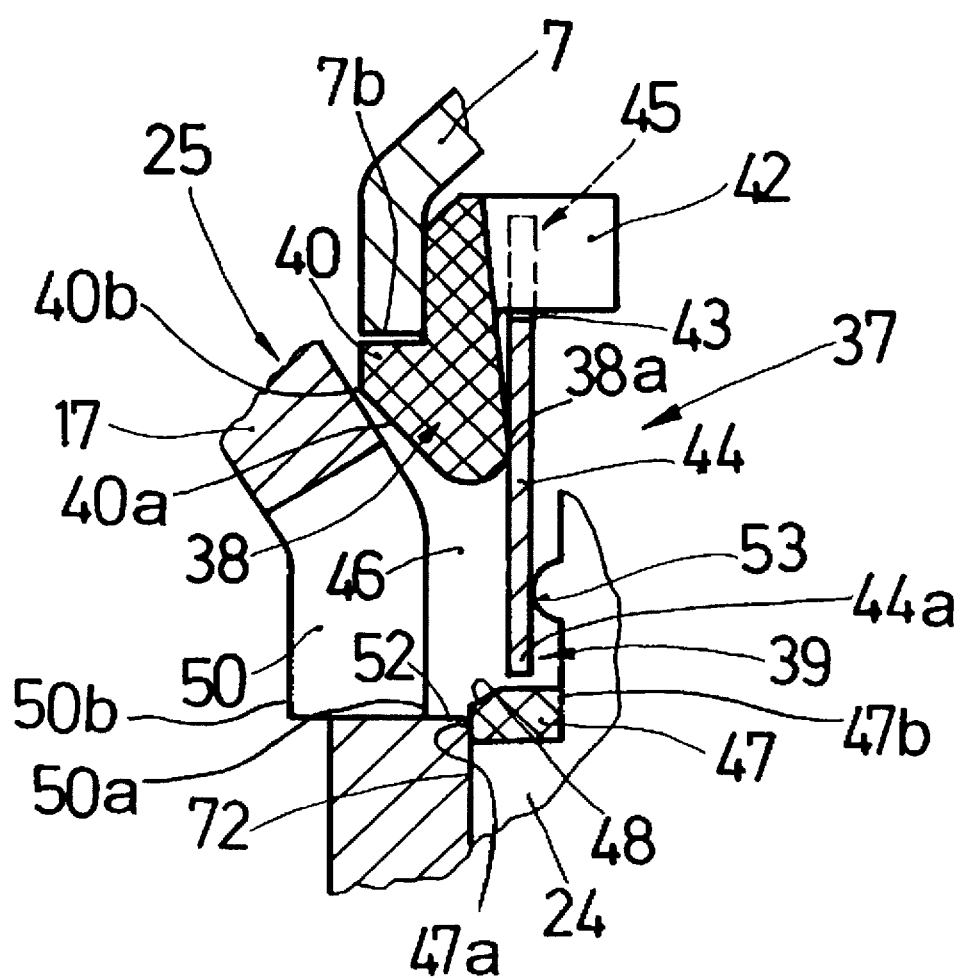
FIG. 2 depicts the seal as detail Z of FIG. 1, depicted separately and enlarged.
Figure 5:
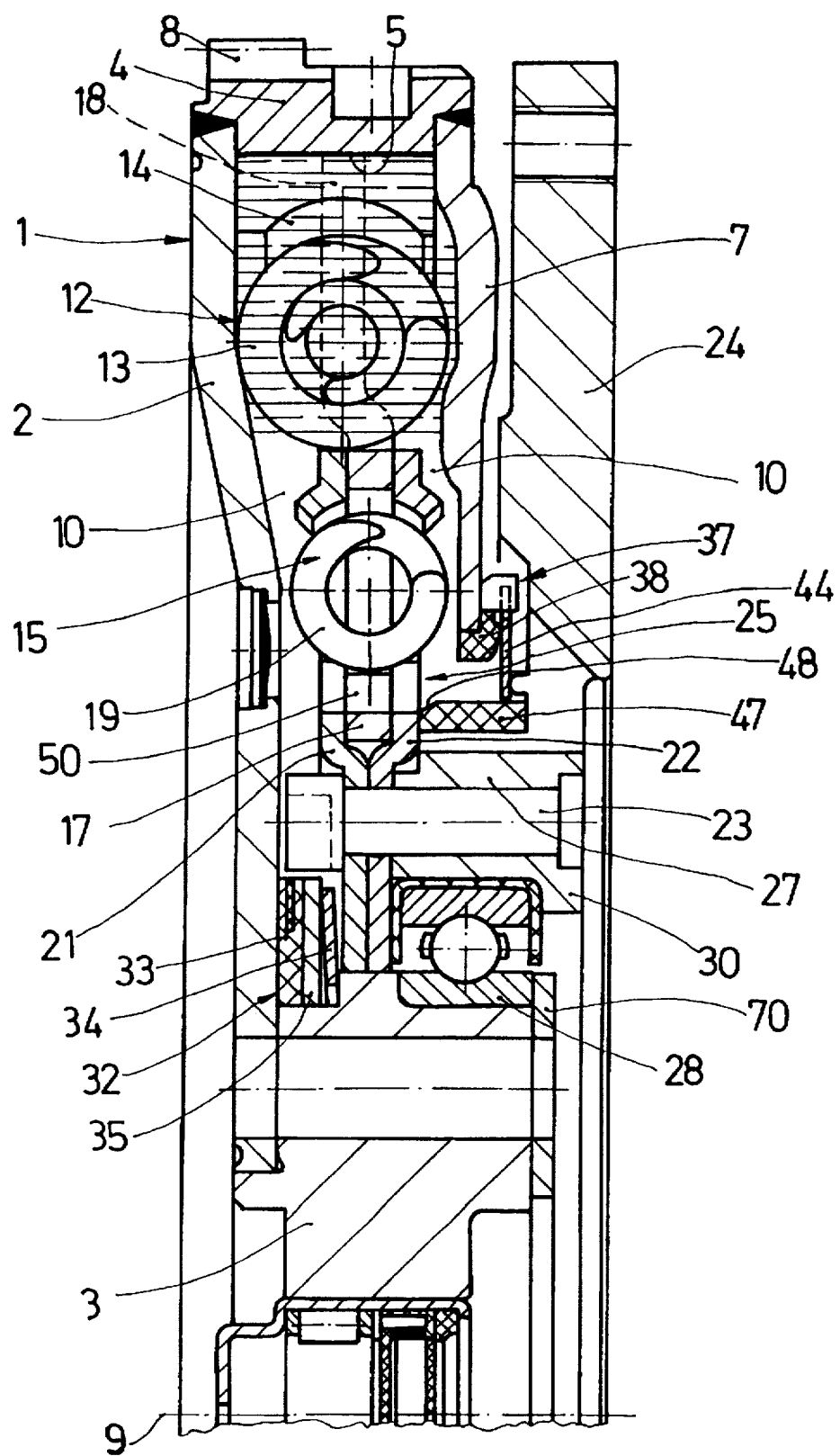
FIG. 5 is similar to FIG. 1, but shows an additional torsional vibration damper and, because of the additional damper, cover plates on both sides of the hub disc.

FIG. 5 depicts an additional flywheel arrangement which differs from the arrangement as described with respect to FIG. 2, in that a second spring stage 15 of the torsional vibration damper is provided radially inside the spring stage 12. This second spring stage 15 is essentially also controlled by the hub disc 17. The second spring stage 15 preferably extends, with two radially projecting noses 18 of hub disc 17, between spring casings 14. The hub disc 17 can preferably be provided with additional windows to accommodate the springs 19 of the second spring stage 15.

Radially inside the springs 13 of the first spring stage 12, two cover plates 21 and 22 can be disposed on both sides of the hub disc 17. These cover plates 21, 22 likewise can have windows for the springs 19 of the second spring stage 15. The cover plates 21, 22 essentially surround the cover plate 7 on both sides thereof, and the second spring stage 15 essentially acts between the cover plates 21, 22 and the cover plate 7, permitting a limited, damped relative rotation therebetween. The cover plates 21, 22 can preferably be shaped, or bent axially toward each other radially inside the hub disc 17, to abut each other, and can be solidly connected by rivets 23 in this region with the second flywheel 24. The second flywheel 24, in the riveted region, can preferably have a collar 27, which collar 27 can extend in the direction toward the primary disc 2, and in the region of the collar 27, the second flywheel 24 can be mounted and axially attached on the bearing 28. The bearing 28, for its part, can be axially attached on the hub 3 by a disc 70, while the second flywheel 24 can be axially attached by a flange 30, as well as by the radially inward region of the cover plates 21 and 22.

Just as with the aforementioned first exemplary embodiment, with this flywheel arrangement the seal 37 can preferably be attached on the radially inward end of the cover plate 7, which cover plate 7 is attached to the first flywheel 1. The seal 37 can have a sealing element 38 as well as a sealing element 39 in the form of an energy absorber 44. The energy absorber 44 can preferably coordinate with a guide element 47, and the guide element 47 can have a flow guide 48. Because of the essentially similar design of the seal 37 of FIG. 5 with the design according to the exemplary embodiment described with reference to FIGS. 1 and 2, the design as shown in FIG. 5 is not further detailed here. Identical elements of the seal 37 are however provided with the same reference numbers as in the first exemplary embodiment.

In contrast to the guide element 47 in the first exemplary embodiment, the guide element 47 in the flywheel arrangement of the embodiment shown in FIG. 5 does not abut the hub disc 17, but instead abuts the cover plate 22. This cover plate 22 acts, as does the other cover plate 21 disposed on the opposite side of the hub disc 17, as the torque carrier 25 for the second flywheel 24.

Figure 6:
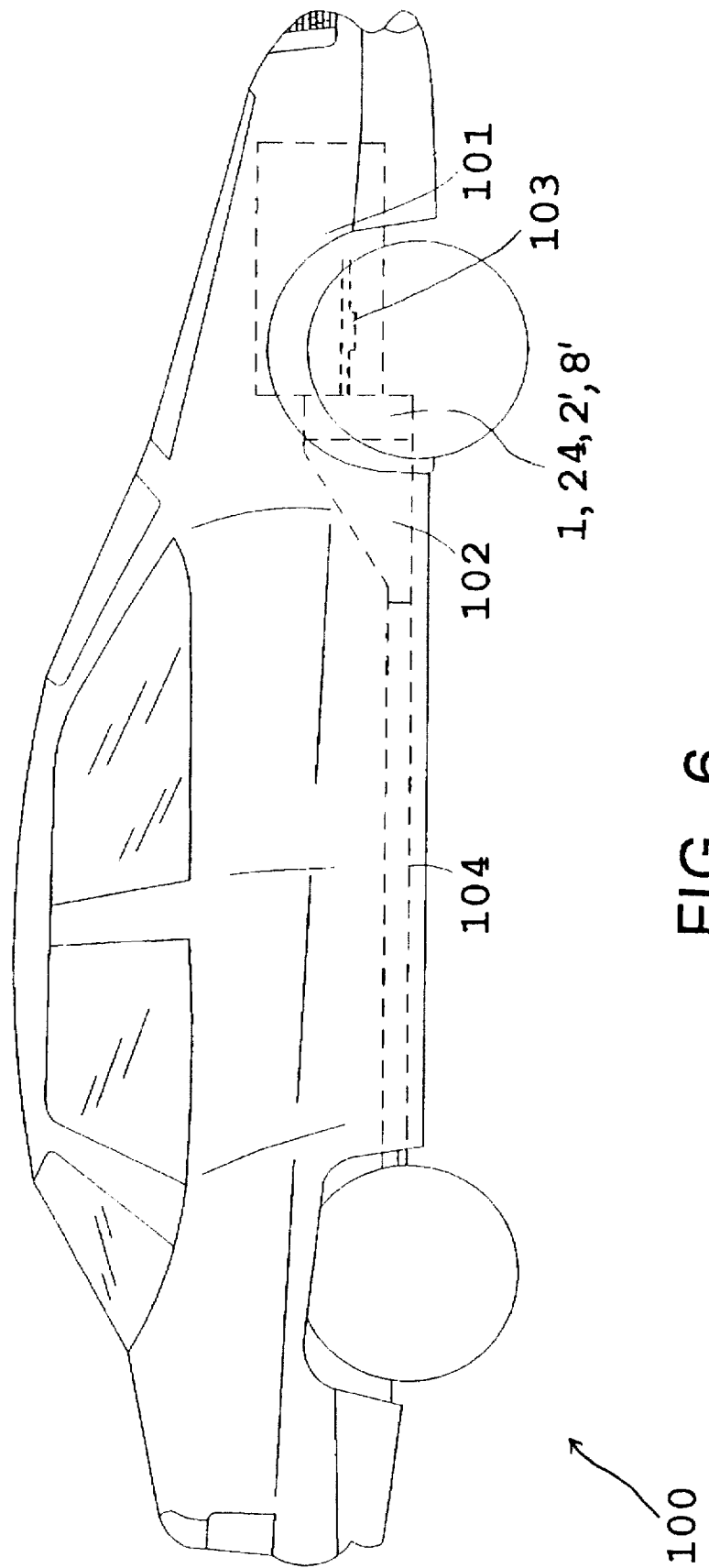
FIG. 6 depicts a general representation of a motor vehicle and a drive train thereof.

FIG. 6 shows what could be considered to be a typical automobile 100, which automobile 100 can include an internal combustion engine 101, which can be mounted in a forward portion of the automobile 100. The combustion engine 101 can have a crankshaft 103 for outputting mechanical rotary power generated by the engine 101. The automobile 100 could also typically include a transmission 102 for transmitting mechanical power from the crankshaft 103 of the engine 101 to the wheels, via drive shaft 104. If the automobile 100 has a manual transmission 102, the flywheels 1, 24, pressure plate 2', and clutch disc 8' of the present invention may also be included for engaging the transmission 102 with the engine 101.

One feature of the invention resides broadly in the flywheel arrangement, which has a first flywheel releasably connected with the crankshaft of an internal combustion engine, a second flywheel rotatable relative to the first flywheel, and a torque carrier including a torsional vibration damper disposed between the two flywheels in a chamber at least partially filled with a viscous medium, such as a hub disk or cover plate for this, whereby the chamber is bounded on its side facing the second flywheel by a cover plate, which coordinates preferably with a seal disposed in its radially inward region, characterized in that the seal 37 has a plurality of sealing elements 38,39 disposed one after another in the discharge direction of the viscous medium, which sealing elements are installed up to gap width on the respective associated components to be sealed (torque carrier 25, guide element 47), whereby at least one of these sealing elements 38,39 is associated with a flow guide 48 which is used to divert viscous medium into a return channel 50 leading into the chamber 10.

Another feature of the invention resides broadly in the flywheel arrangement characterized in that the sealing elements 38,39 bound at least one receiving space 46 for the viscous medium, which space is connected with the chamber 10 via the return channel 50.

Yet another feature of the invention resides broadly in the flywheel arrangement characterized in that the return channel 50 passes through the torque carrier 25.

Still another flywheel arrangement characterized in that the torque carrier 25 has on the radially inward end of the return channel 50 a projection 52 directed toward the seal 37, which, through collection of viscous medium which has flowed radially inward, serves as a flow guide 48 to divert the medium into the return channel 50.

A further feature of the invention resides broadly in the flywheel arrangement characterized in that the projection 52 can be fabricated by designing the torque carrier 25 with an axial offset 72 facing the seal 37, whereby this offset 72 runs radially inward beginning in the region of the radially inward end of the return channel 50.

Another feature of the invention resides broadly in the flywheel arrangement characterized in that adjacent to the side of the return channel 50 facing the receiving space 46 in the region of the radially inward end of the return channel, a guide element 47 is provided, which has, on its side facing the return channel 50, a flow guide 48 to direct the viscous medium into the return channel 50.

Yet another feature of the invention resides broadly in the flywheel arrangement characterized in that the guide element 47 has a larger external diameter compared to the radially inward end of the return channel 50 and, starting from this, narrows radially in the direction toward the return channel 50 to form a flow guide 48.

Still another feature of the invention resides broadly in the flywheel arrangement characterized in that the sealing elements 38,39 operate with an essentially radial distance between each other.

A further feature of the invention resides broadly in the flywheel arrangement characterized in that the sealing element 38 associated with the radially farther outward sealing point has a radial widening 40 radially inward in the direction of the component to be sealed (torque carrier 25), which preferably assumes its maximum at the sealing point.

Another feature of the invention resides broadly in the flywheel arrangement characterized in that an energy absorber 44 acting as a sealing element 39 comes into contact with the sealing element 38 associated with the radially farther outward sealing point on its side turned away from the sealing point, which energy absorber axially pushes against the second flywheel 24 on its opposite side.

Yet another feature of the invention resides broadly in the flywheel arrangement characterized in that the energy absorber 44 is installed in the radial direction up to gap width on the guide element 47.

Still another feature of the invention resides broadly in the flywheel arrangement characterized in that on at least one side the energy absorber 44 comes into contact with a preferably annular projection 53 of the associated element (sealing element 38, flywheel 24).

A further feature of the invention resides broadly in the flywheel arrangement characterized in that an annular protrusion 56 facing the receiving space 46 is formed on the guide element 47 radially inside the contact region with the energy absorber 44 adjacent thereto.

Another feature of the invention resides broadly in the flywheel arrangement characterized in that an anti-torsion element 45 for the energy absorber 44 is associated with one of the two sealing elements 38,39.

Some examples of transmissions in which the present invention may be incorporated may be disclosed by the following U.S. Pat. No. : 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of clutch assemblies which could possibly be used in conjunction with the present invention may be disclosed in the following U.S. Pat. No. : 4,684,007 to Maucher, entitled "Clutch Plate"; U.S. Pat. No. 4,635,780 to Wiggen, entitled "Clutch Disc for a Motor Vehicle Friction Clutch"; and U.S. Pat. No. 4,651,857 to Schraut et al., entitled "Clutch Disc Unit for a Motor Vehicle Clutch".

Some examples of two-mass flywheels and the components thereof which may incorporate the present invention therein may be disclosed by the following U.S. Pat. No. : 5,103,688 to Kuhne, entitled "Two-Mass Flywheel"; U.S. Pat. No. 4,777,843 to Bopp, entitled "Two-Mass Flywheel Assembly With Viscous Damping Assembly".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 13 998.5, filed on Apr. 22, 1994, having inventors Hilmar Göbel and Bernhard Schierling, and DE-OS P 44 13 998.5 and DE-PS P 44 13 998.5, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A flywheel comprising:

a first flywheel portion and a second flywheel portion, said second flywheel portion being disposed adjacent said first flywheel portion;

said first flywheel portion comprising means for non-rotationally connecting said first flywheel portion to a crankshaft of an internal combustion engine;

said first flywheel portion being rotationally mounted about an axis of rotation;

said second flywheel portion being rotationally mounted about said axis of rotation and limitably rotatable relative to said first flywheel portion;

means for transmitting rotational torque from said first flywheel portion to said second flywheel portion for rotating said second flywheel portion with said first flywheel portion;

said first flywheel portion comprising a primary disc and a cover plate, said cover plate being spaced axially from said primary disc to define an annular chamber between said primary disc and said cover plate, said chamber being disposed about said axis of rotation and having a lubricating medium therein;

said second flywheel portion comprising a first disc-shaped member disposed at least partially within said chamber of said first flywheel portion and a hub disc disposed adjacent said cover plate of said first flywheel portion;

said first disc-shaped member of said second flywheel portion being disposed between said primary disc of said first flywheel portion and said cover plate of said first flywheel portion;

said cover plate of said first flywheel portion being disposed between said first disc-shaped member of said second flywheel portion and said hub disc of said second flywheel portion;

said cover plate and said hub disc of said second flywheel portion together defining a space therebetween, the space leading out of said chamber to an exterior of said flywheel;

said flywheel further comprising seal means disposed at least adjacent the space leading out of said chamber for sealing lubricating medium in said chamber;

said seal means comprising at least first and second sealing members for sealing lubricating medium into said chamber;

the space leading out of said chamber defining a direction of flow out of said chamber to the exterior of said flywheel;

said seal means comprising two annular sealing elements disposed adjacent one another about said axis of rotation, and one after the other in the direction of flow out of said chamber; and at least one of said two sealing elements is disposed to divert lubricating medium away from the space leading out of said chamber and back into said chamber.

2. The flywheel according to claim 1, wherein:

said at least one of said two sealing elements comprises means for directing fluidized lubricating medium away from the space, and for minimizing accumulation of lubricating medium adjacent the space and minimizing loss of fluidized lubricating medium out of said chamber through the space; and each of said two sealing elements are disposed on one of: said cover plate of said first flywheel portion and said hub disc of said second flywheel portion, and extend towards the other of: said cover plate of said first flywheel portion and said hub disc of said second flywheel portion, and each defines a gap having a gap width with respect to the other of said cover plate of said first flywheel portion and said hub disc of said second flywheel portion, said gap widths being minimized while avoiding contact between each of said two sealing elements and the other of said cover plate of said first flywheel portion and said hub disc of said second flywheel portion.

3. The flywheel according to claim 2, wherein:

said seal means comprises a first sealing element and a second sealing element, said first sealing element sealing between said cover plate of said first flywheel portion and said second sealing element, and said second sealing element sealing between said first sealing element and said second flywheel portion;

said first disc-shaped member of said second flywheel portion comprises at least one flow passage therethrough adjacent said seal means for permitting lubricating medium to flow back into said chamber from adjacent the space; and said at least one flow passage being disposed for minimizing accumulation of lubricating medium adjacent the space.

4. The flywheel according to claim 3, wherein:

said seal means together with said first disc-shaped member of said second flywheel portion define a ring-shaped collection space for collecting lubricating medium therein;

said collection space has a radially inner edge;

said at least one flow passage has a radially inner edge substantially aligned with said radially inner edge of said collection space to permit flow of the fluidized lubricating medium out of said collection space under gravitational force; and said means for directing forms a substantial portion of said radially inner edge of said collection space to guide flow of lubricating medium away from the space and into said at least one flow passage.

5. The flywheel according to claim 4, wherein:

said first disc-shaped member of said second flywheel portion comprises an axial offset adjacent said radially inner edge of said at least one flow passage and offset in a direction towards said hub disc, said axial offset comprises an additional flow guide for diverting flow of lubricating medium into said at least one flow passage;

said means for directing comprises a cylindrical sleeve disposed between said first disc shaped member of said second flywheel portion and said hub disc; and said cylindrical sleeve has a first external diameter adjacent said first disc-shaped member of said second flywheel portion and a second external diameter adjacent said hub disc of said second flywheel portion, said first external diameter being less than said second external diameter to inhibit flow of lubricating medium towards said hub disc and guide flow of lubricating medium into said at least one flow passage of said first disc-shaped member of said second flywheel portion under gravitational force.

6. The flywheel according to claim 5, wherein:

said cover plate of said first flywheel portion has a radially inner edge, said radially inner edge being disposed a radial distance from said cylindrical sleeve;

said first sealing element is disposed adjacent said radially inner edge of said cover plate of said first flywheel portion, and provides a seal with said radially inner edge;

said second sealing element extends radially inwardly from said first sealing element towards said cylindrical sleeve, said second sealing element has a radially outer edge and a radially inner edge;

said first sealing element sealing with said second sealing element at a position between said radially inner edge and said radially outer edge of said second sealing element;

said radially inner edge of said second sealing element and said cylindrical sleeve define one of said gap widths therebetween;

said second sealing element seals against said cover plate adjacent said radially inner edge of said second sealing element;

said first sealing element comprises an annular portion extending from said cover plate of said first flywheel portion towards said first disc-shaped member of said second flywheel portion, said extending portion defining another of said gap widths between said first sealing element and said first disc-shaped member of said second flywheel portion;

said extending portion of said first sealing member has a thickness in the radial direction, said thickness decreasing in an axial direction towards said first disc-shaped member of said second flywheel portion and tapers in a radially outward direction to a circular edge on said extending portion, said circular edge defining said gap width.

7. The flywheel according to claim 6, wherein:

said second sealing element comprises an annular disc, said annular disc being axially pretensioned between said cover plate of said first flywheel portion and said hub disc of said second flywheel portion to permit limited axial movement between said said cover plate of said first flywheel portion and said hub disc of said second flywheel portion while maintaining a seal between said cover plate of said first flywheel portion and said hub disc of said second flywheel portion;

said disc-shaped sealing element having a first side for sealing with said first sealing element, and a second side opposite said first side and directed towards said hub disc;

said hub disc pushes axially against said second side of said disc-shaped sealing element to provide said seal between said hub disc and said second sealing element;

said disc-shaped sealing element is disposed concentrically about said cylindrical sleeve and spaced said gap width away from said cylindrical sleeve;

said second disc-shaped sealing member of said second flywheel portion has a side surface disposed towards said second disc-shaped sealing member of said first flywheel portion, said side surface of said second disc-shaped sealing member of said second flywheel portion comprises a protrusion extending axially towards said disc-shaped sealing member, said protrusion being disposed adjacent said radially inner edge of said disc-shaped sealing member to engage said disc-shaped sealing member and tension said disc-shaped sealing member axially towards said first disc-shaped sealing member of said second flywheel portion;

said radially outer edge of said disc-shaped sealing member and said first sealing element comprise means for non-rotationally engaging said disc-shaped sealing element with said first sealing element;

said first sealing element and said disc-shaped sealing element being rotatably movable about said axis of rotation along with said cover plate;

said disc-shaped sealing element and said projection of said side surface of said hub disc rotate relative to one another during relative movement between said first flywheel portion and said second flywheel portion;

said first disc-shaped member of said second flywheel portion comprises a plurality of windows therethrough;

said primary disc and said cover plate comprise protrusions extending therefrom and towards the other of said primary disc and said cover plate;

said means for transmitting rotational torque comprises a first torsional vibration damper, said first torsional vibration damper comprising spring means disposed within said windows and abutting said protrusions of said primary disc and said cover plate to bias said first and second flywheel portions from rotating relative to one another and dampening any relative rotation therebetween; and said lubricating medium comprising a heavy grease for lubricating said first torsional vibration damper and providing a further dampening function.

8. A flywheel for an internal combustion engine of a motor vehicle comprising:

a first flywheel portion and a second flywheel portion, said second flywheel portion being disposed adjacent said first flywheel portion;

said first flywheel portion comprising means for non-rotationally connecting said first flywheel portion to a crankshaft of an internal combustion engine;

said first flywheel portion being rotationally mounted about an axis of rotation;

said second flywheel portion being rotationally mounted about said axis of rotation and limitably rotationally mounted relative to said first flywheel portion;

means for transmitting rotational torque from said first flywheel portion to said second flywheel portion for rotating said second flywheel portion with said first flywheel portion;

said first flywheel portion comprising a primary disc and a cover plate, said cover plate being spaced axially from said primary disc to define an annular chamber between said primary disc and said cover plate, said chamber being disposed about said axis of rotation and comprising a lubricating medium therein;

said second flywheel portion comprises a first disc-shaped member disposed at least partially within said chamber of said first flywheel portion and a hub disc disposed adjacent said cover plate of said first flywheel portion;

said first disc-shaped member of said second flywheel portion being disposed between said primary disc and said cover plate;

said cover plate being disposed between said first disc-shaped member of said second flywheel portion and said hub disc;

said cover plate and said hub disc together defining a space therebetween, the space leading out of said chamber to an exterior of said flywheel; and said flywheel further comprises means for directing said fluidized lubricating medium away from the space leading out of said chamber for minimizing loss of fluidized lubricating medium out of said chamber though the space.

9. The flywheel according to claim 8, wherein:

said first disc-shaped member of said second flywheel portion comprises at least one flow passage therethrough adjacent said seal means for permitting lubricating medium to flow back into said chamber from adjacent the space; and said at least one flow passage being disposed for minimizing accumulation of lubricating medium adjacent the space.

10. The flywheel according to claim 9, wherein:

said first disc-shaped member and said hub disc of said second flywheel portion define a ring-shaped collection space for collecting lubricating medium adjacent said space between said cover plate and said hub disc; and said means for directing fluidized lubricating medium away from said space comprise means for minimizing flow of fluidized lubricating medium into said collection space.

11. The flywheel according to claim 10, wherein:

said means for minimizing flow of fluidized lubricating medium into said collection space comprises a first annular element disposed on said cover plate and extending towards said first disc-shaped member of said second flywheel portion to define a first gap therebetween; and said first gap has a gap width, said gap width being substantially minimized while avoiding contact between said annular element and said primary disc.

12. The flywheel according to claim 11, wherein:

the space defines a direction of flow out of said chamber to the exterior of said flywheel;

said flywheel further comprises seal means for sealing said space and maintaining fluidized lubricating medium in said chamber;

said seal means comprises two annular sealing elements disposed adjacent one another about said axis of rotation, and one after the other in the direction of flow out of said chamber; and at least one of said two sealing elements is disposed to divert lubricating medium away from the space and towards said at least one flow passage.

13. The flywheel according to claim 12, wherein:

said two sealing elements comprise a first sealing element and a second sealing element, said first sealing element sealing between said cover plate and said second sealing element, and said second sealing element sealing between said first sealing element and said second flywheel portion;

said first sealing element comprises said annular extension;

said second sealing element defines a second gap with respect to said second flywheel portion, said second gap having a gap width, said gap width being substantially minimized while avoiding contact between said second sealing element and said second flywheel portion;

said first and second sealing elements together with said first disc-shaped member of said second flywheel portion define said ring-shaped collection space for collecting lubricating medium therein;

said collection space has a radially inner edge;

said at least one flow passage has a radially inner edge substantially aligned with said radially inner edge of said collection space to permit flow of the fluidized lubricating medium out of said collection space under gravitational force; and said means for directing forms a substantial portion of said radially inner edge of said collection space to guide flow of lubricating medium away from the space and into said at least one flow passage.

14. The flywheel according to claim 13, wherein:

said first disc-shaped member of said second flywheel portion comprises an axial offset adjacent said radially inner edge of said at least one flow passage and offset in a direction towards said hub disc, said axial offset comprises an additional flow guide for diverting flow of lubricating medium into said at least one flow passage;

said means for directing comprises a cylindrical sleeve disposed between said first disc-shaped member of said second flywheel portion and said hub disc; and said cylindrical sleeve has a first external diameter adjacent said first disc-shaped member of said second flywheel portion and a second external diameter adjacent said hub disc, said first external diameter being less than said second external diameter to inhibit flow of lubricating medium towards said hub disc and guide flow of lubricating medium into said at least one flow passage of said first disc-shaped member of said second flywheel portion under gravitational force.

15. The flywheel according to claim 14, wherein:

said cover plate has a radially inner edge, said radially inner edge being disposed a radial distance from said cylindrical sleeve;

said first sealing element is disposed adjacent said radially inner edge of said cover plate, and provides a seal with said radially inner edge;

said second sealing element extends radially inwardly from said first sealing element towards said cylindrical sleeve, said second sealing element has a radially outer edge and a radially inner edge;

said first sealing element seals with said second sealing element at a position between said radially inner edge and said radially outer edge of said second sealing element;

said radially inner edge of said second sealing element and said cylindrical sleeve define said second gap therebetween; and said second sealing element seals against said cover plate adjacent said radially inner edge of said second sealing element.

16. The flywheel according to claim 15, wherein said annular extension of said first sealing element has a thickness in the radial direction, said thickness decreasing in an axial direction towards said first disc-shaped member of said second flywheel portion and tapers in a radially outward direction to a circular edge on said extending portion, said circular edge defining said first gap.

17. The flywheel according to claim 16, wherein:

said second sealing element comprises an annular disc, said annular disc being axially pretensioned between said cover plate and said hub disc to permit limited axial movement between said cover plate and said hub disc while maintaining a seal between said cover plate and said hub disc;

said disc-shaped sealing element having a first side for sealing with said first sealing element, and a second side opposite said first side and directed towards said hub disc;

said hub disc pushes axially against said second side of said disc-shaped sealing element to provide said seal between said hub disc and said second sealing element; and said disc-shaped sealing element is disposed concentrically about said cylindrical sleeve and spaced said gap width away from said cylindrical sleeve.

18. The flywheel according to claim 17, wherein:

said second disc-shaped sealing member of said second flywheel portion has a side surface disposed towards said second disc-shaped sealing member of said first flywheel portion, said side surface of said second disc-shaped sealing member of said second flywheel portion comprises a protrusion extending axially towards said disc-shaped sealing member, said protrusion being disposed adjacent said radially inner edge of said disc-shaped sealing member to engage said disc-shaped sealing member and tension said disc-shaped sealing member axially towards said first disc-shaped sealing member of said second flywheel portion;

said radially outer edge of said disc-shaped sealing member and said first sealing element comprise means for non-rotationally engaging said disc-shaped sealing element with said first sealing element;

said first sealing element and said disc-shaped sealing element being rotatably movable about said axis of rotation along with said cover plate; and said disc-shaped sealing element and said projection of said side surface of said hub disc of said second flywheel portion rotate relative to one another during relative movement between said first flywheel portion and said second flywheel portion.

19. The flywheel according to claim 18, wherein:

said first disc-shaped member of said second flywheel comprises a plurality of windows therethrough;

said primary disc and said cover plate comprise protrusions extending therefrom and towards the other of said primary disc and said cover plate;

said means for transmitting rotational torque comprises a first torsional vibration damper, said first torsional vibration damper comprising spring means disposed within said windows and abutting said protrusions of said primary disc and said cover plate to bias said first and second flywheel portions from rotating relative to one another and dampening any relative rotation therebetween; and said lubricating medium comprising a heavy grease for lubricating said first torsional vibration damper and providing a further dampening function.

20. The flywheel according to claim 19, wherein:

said first disc-shaped member of said second flywheel portion comprises three annular discs;

a first and second of said annular discs being disposed adjacent one another and non-rotationally connected to said hub disc;

at least one of said first and second annular discs comprising a portion axially offset in a direction away from the other of said first and second annular discs to define a space therebetween, said axially offset portion comprising a radially outward portion;

said third disc being at least partially disposed within said space between said first and second annular discs, and rotatable relative to said first and second discs;

said third disc comprising a radially outer portion and a radially inner portion, said radially inner portion being disposed in said space;

said radially outer portion of said third disc comprising said first torsional vibration damper in conjunction with said primary disc and said cover plate;

said radially inner portion of said third disc comprising a second torsional vibration damper in conjunction with said first and second discs for damping relative rotational movement between said third disc and said first and second discs;

said first flywheel portion comprises an annular connecting member disposed between and spacing said primary disc and said cover plate apart from one another, said annular connecting member being non-rotationally connected to each of said primary disc and said cover plate;

said annular connecting member has an exterior surface disposed radially away from said chamber and an interior surface defining at least a part of said chamber;

said exterior surface comprising toothing for being engaged by a starter of a motor vehicle for rotating said first flywheel portion about said axis of rotation;

said hub disc comprises a second side surface disposed away from said flywheel, said second side surface being configured for frictionally engaging a clutch plate of a clutch to transfer rotational power from said flywheel to a clutch plate;

said flywheel comprises a hub disposed concentrically about said axis of rotation;

said primary disc being non-rotationally connected to said hub;

said second flywheel portion being disposed about and relatively rotatable with respect to said hub; and said hub additionally comprises bearing means for rotationally mounting said second flywheel portion thereon.

* * * * *

UNITED STATES PATENT AND TRADEMARK OFFICE
CERTIFICATE OF CORRECTION

PATENT NO. : 5,636,553
DATED : June 10, 1997
INVENTOR(S) : Hilmar GÖBEL and Bernhard SCHIERLING It is certified that error appears in the above-identified patent and that said Letters Patent is hereby corrected as shown below:

In column 9, line 44, after 'shaped', delete "collections pad" and insert --collection space--.

Signed and Sealed this

Ninth Day of September, 1997

Attest:

BRUCE LEHMAN

Attesting Officer

Commissioner of Patents and Trademarks